United States Patent Office 3,008,677
Patented Nov. 14, 1961

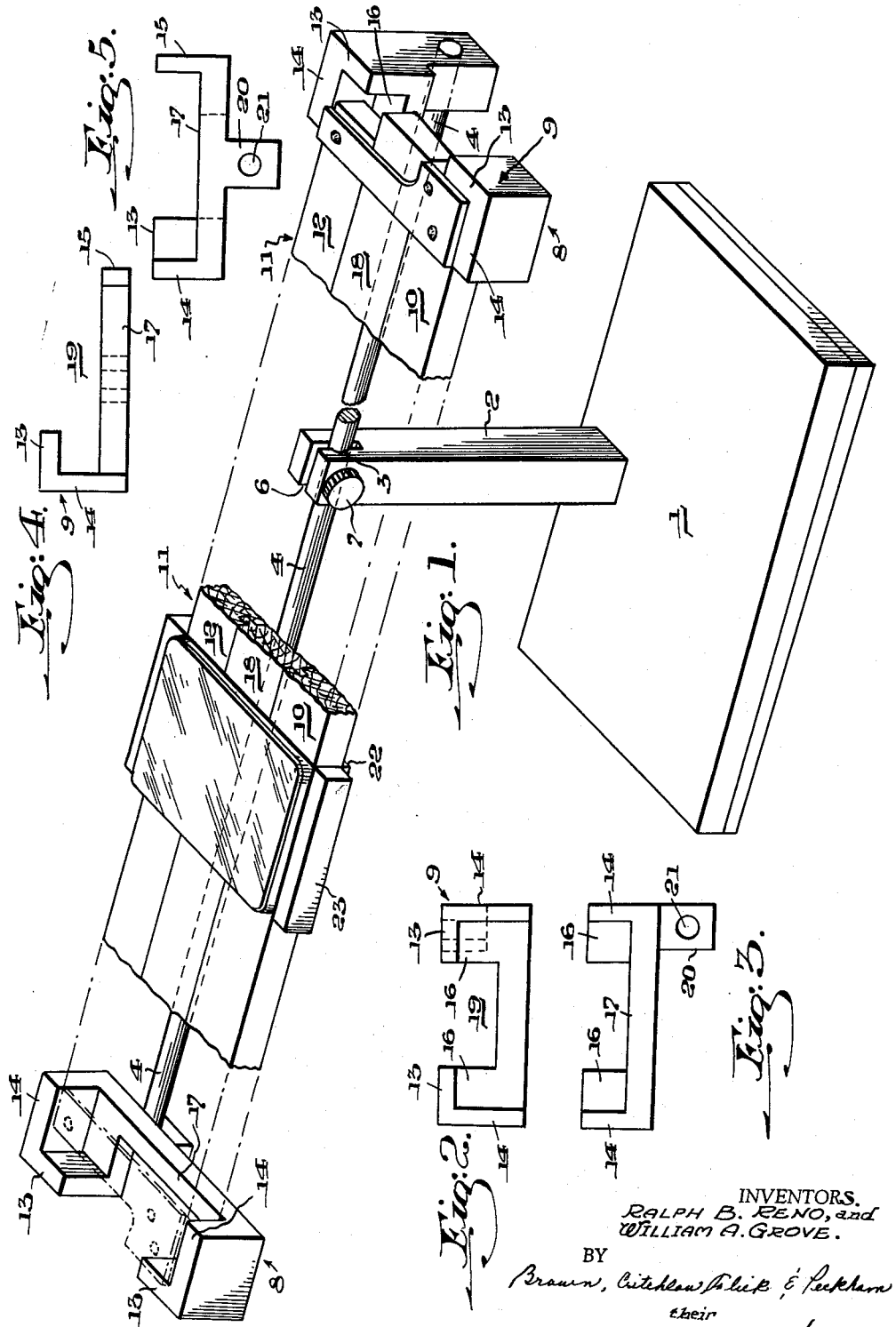

3,008,677
HOLDER FOR SLIDE RULE
William A. Grove, R.D. 1, Silverlane, McKees Rocks, Pa., and Ralph B. Reno, 30 Greenwood Ave., Ingram, Pittsburgh 5, Pa.
Filed May 18, 1959, Ser. No. 813,880
5 Claims. (Cl. 248—122)

The present invention relates to a holder for a logarithmic slide rule of the type commonly used by engineers and others in making arithmetical computations. Such rules have two fixed scale members with a sliding scale member between them. Generally, there are scales on both sides of the rule, and a sliding glass index member is provided for each of the scaled surfaces.

It is among the objects of this invention to provide a holder for slide rules of the above type, which will hold the rule firmly without interfering with the freedom of movement of the sliding scale member or the index slide, which will permit complete manipulation of the rule with only one hand, which can be readily adjusted to position the scale surfaces at a convenient operating angle, and which will permit the rule to be easily reversed to utilize the scales on both sides of the rule.

Further objects of the invention will be apparent from the following description, in connection with the attached drawings, in which FIG. 1 represents an isometric view of the assembled slide rule holder;

FIGS. 2 and 3 are plan and end elevations, respectively, of one of the end supports shown in FIG. 1; and FIGS. 4 and 5 are similar views of a modified form of end support.

In accordance with this invention, the holder includes two spaced end supports adapted to support opposite ends of the fixed scale members of the slide rule and hold them against endwise and sidewise movements, while still permitting access to and full manipulation of the sliding scale member and of the index slide. Each of the supports is provided with a recess or notch in its central end portion, so as to engage only the outside corners and adjacent bottoms of the fixed scale members, thereby avoiding interference with the lengthwise movement in either direction of the sliding scale member or with access by the operator's finger to either end of that member. These end supports are held in spaced relation by a horizontal connecting member that is itself spaced below the bottom of the rule and the index slide when the rule is held in the supports. This latter feature permits free operation of the index slide along the length of the rule. The connecting member is preferably mounted on a post fixed to a base, so that the holder will support the slide rule at a convenient height above the level of a table or other surface. If desired, the connecting member may be angularly adjustable about its longitudinal axis to incline the scaled surface of the rule at a convenient angle for easy reading.

Referring to the drawings, a base 1, preferably of rectangular shape and of heavy material, supports a post 2. Near the top of this post is a hole 3 for rotatably receiving a connecting member 4, which may be a metal or wooden rod. If desired, the latter may be of the telescoping type that can be locked at different lengths to accommodate different sizes of slide rules. The top of the post is preferably provided with a vertically extending slot 6, so that, if the hole 3 is of slightly smaller diameter than the connecting member 4, the latter will be frictionally held in the post. If desired, the connecting member may be locked by a screw 7 extending through the slotted post above the hole 3, as shown in FIG. 1. Alternatively, the slot in the post can be eliminated and the connecting member adjustably held in the post by a set screw (not shown).

On each end of the connecting member is secured an end support 8. Each support includes at least one corner abutment 9, adapted to engage an outer corner of one of the fixed scale members 10 of a slide rule 11 (the rule being shown diagrammatically in FIG. 1). Each corner abutment includes an end abutment 13 and a side abutment 14. In FIGS. 1–3, two corner abutments are shown for each support, which will restrain all generally used types of slide rules from endwise and sidewise movement, including double-faced slide rules with one fixed scale member 12 shorter than the other member 10 regardless of which face is uppermost. For single-faced slide rules (i.e., no fixed scales on one side) or for double-faced rules having fixed scale members of the same length, one corner abutment and an opposed side abutment 15 (see FIGS. 4 and 5) are all that are needed on each support to restrain the rule from endwise and sidewise movement. Each end support may also include bottom abutments 16, integral with the corner abutments, for supporting the bottom of the fixed scale members of the rule and a cross member 17 connecting these abutments (see FIGS. 1–3). The cross member may, if desired, function as the sole bottom abutment, as shown in FIGS. 4 and 5. In either case, the cross member is spaced inwardly from the end abutment. If bottom abutments 16 are present, they are spaced from each other, as are the opposed portions of the end abutments. As a result of these features, the sliding scale member 18 of the rule is free to move endwise in either direction, and an access notch or recess 19 is provided into which the operator may insert his finger to move the sliding scale member initially from its normal aligned position with the fixed scale members.

Each end support is provided with a depending mounting portion 20, which may be an extension of the corner abutment (see FIGS. 1 and 3) or of the cross member (see FIG. 5). The connecting member 4 is fixedly received in a hole 21 in this mounting portion, so as to interconnect the two end supports and space the connecting member 4 below the bottom of the rule and below the lower glass 22 of index slide 23 to provide clearance for the latter. To permit the index slide to traverse the full length of the fixed scales, the side abutments 14 of each end support are relatively short and the cross members 17 are not spaced from the outer ends of those supports more than is necessary to provide an access notch to the sliding scale member.

The bottom of the base 1 may be provided with a layer of anti-friction material 24, such as felt or rubber, to prevent its sliding on a smooth surface. Alternatively, it can be provided with rubber suction cups for the same purpose.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
1. A holder for a slide rule having two fixed scale members and a sliding scale member between them, said holder comprising a pair of spaced supports each of which is open at the top and adapted to receive by insertion from above and to support an opposite end of the rule and each of which includes a corner abutment adapted to engage an outside corner of one of the fixed scale members without overlapping the end of the sliding scale member and an opposite side abutment adapted to engage the side of the other fixed scale member adjacent its outside corner, thereby to limit sidewise and endwise movements of the fixed scale members without limiting endwise movement of the sliding scale member, each support also including a bottom abutment for supporting the bottoms of the fixed scale members adjacent their ends but providing access to the bottom of the sliding scale member at the end of the rule, and a connecting member joining the two supports and spaced below the bottom of the rule when the latter is held in the supports to provide clearance for a sliding index member on the rule.

2. Apparatus according to claim 1, in which each support also includes a cross member joining the corner and side abutments of that support, the cross member being spaced from the end of the support to provide access from below to the sliding scale member at the end of a rule held on the support.

3. A holder for a double-faced slide rule having two fixed scale members of unequal length, the longer of which extends beyond the shorter an equal distance at each end of the rule and also having a sliding scale member of the same length as the longer of the two fixed scale members mounted between the latter members, said holder comprising a pair of horizontally spaced and upwardly open end supports adapted to receive by insertion directly from above and to support the ends of the rule, each end support including two end abutments lying in the same vertical plane and two opposed side abutments lying in parallel vertical planes, one of the end abutments in each support, depending upon which face of the rule is uppermost, being adapted to overlap an end of the longer fixed scale member to prevent endwise movement of the rule in the holder, the end abutments of each support being spaced apart a sufficient distance to permit the sliding scale member to pass between them, the side abutments of each support being spaced apart sufficiently to hold the rule against forward and backward movement in the holder, each support also including a bottom portion for supporting the bottom of the rule adjacent its ends, said bottom portion having a central part underlying the sliding scale member that is spaced inwardly from the end abutments to provide clearance for manually moving the sliding scale member by pressing against the end thereof, and a connecting member joining the two end supports and spaced below the bottom of the rule to provide clearance for a sliding index member on the rule.

4. Apparatus according to claim 3, that also includes a base and a supporting post mounted on the base, the connecting member being mounted near its center on the post.

5. Apparatus according to claim 4, in which the connecting member is adjustably mounted on the post to incline the supports about the axis of the connecting member.

References Cited in the file of this patent

UNITED STATES PATENTS

| 2,469,221 | Adiletta | May 3, 1949 |
| 2,503,801 | Clarke | Apr. 11, 1950 |
| 2,685,748 | Gilbert | Aug. 10, 1954 |
| 2,828,096 | Beri | Mar. 25, 1958 |

FOREIGN PATENTS

| 204,460 | Switzerland | Aug. 1, 1939 |